E. SMITH & E. C. MALTBY.
Machine for Paring Cocoa Nut Meats.

No. 165,959. Patented July 27, 1875.

Witnesses
H. Shumway
Clara Broughton

Edw'd Smith & E Chapman Maltby
Inventors
By Atty
John E Earle

UNITED STATES PATENT OFFICE.

EDWARD SMITH AND E. CHAPMAN MALTBY, OF NORTHFORD, CONNECTICUT, ASSIGNORS TO E. CHAPMAN MALTBY.

IMPROVEMENT IN MACHINES FOR PARING COCOA-NUT MEATS.

Specification forming part of Letters Patent No. 165,959, dated July 27, 1875; application filed July 6, 1875.

*To all whom it may concern:*

Be it known that we, EDWARD SMITH and E. CHAPMAN MALTBY, both of Northford, in the county of New Haven and State of Connecticut, have invented a new Machine for Paring Cocoa-Nut Meats; and we do hereby declare the following, when taken in connection with the accompanying drawings and the letters of reference marked thereon, to be a full, clear, and exact description of the same, and which said drawings constitute part of this specification, and represent, in—

Figure 1:
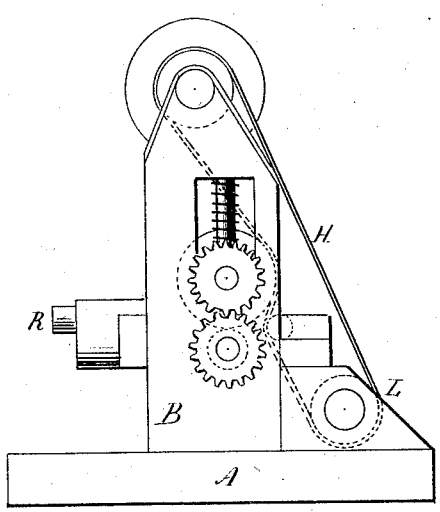
Figure 2:
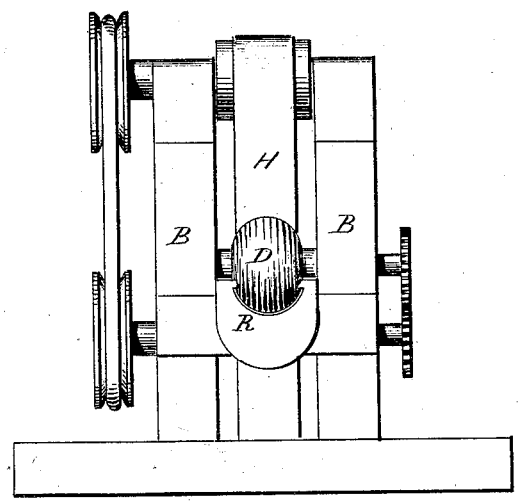
Figure 3:
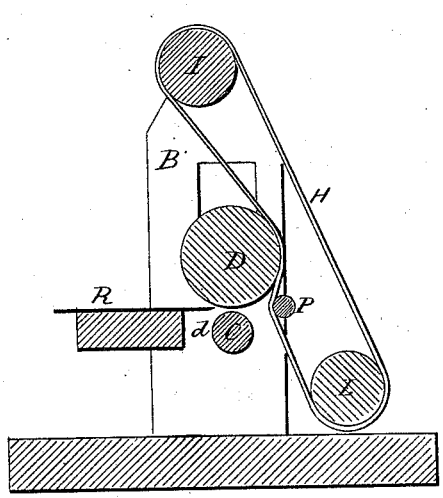
Figure 4:
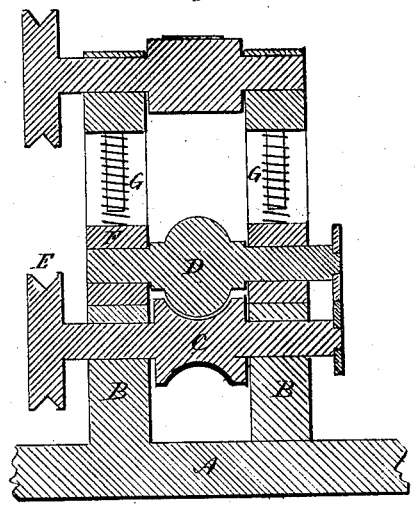

Figure 1, side view; Fig. 2, front view; Fig. 3, transverse section; Fig. 4, longitudinal section.

This invention relates to a machine for taking the rind from cocoa-nut meats, the object being to construct the machine so that by introducing the pieces of the meat as it comes from the shell it will pass out from the machine with the rind taken off.

The invention consists in a pair of cylinders, the one concave and the other convex, geared together, and one made self-adjusting relatively to the other, combined with an endless band bearing upon said convex cylinder to receive the meat between the band and cylinder, and carry it around between the two said cylinders, and with a stationary cutter corresponding in shape to the curve of the said cylinders, and so that by the rotation of the cylinders the meat is forced against said cutter, which shaves the rind from the meat.

A is the bed, upon which are two uprights, B B. C is the concave and D the convex cylinder, arranged upon parallel axes, and geared together, as shown, and caused to revolve by the application of power to one of the shafts through the pulley E or otherwise. The cylinder D is arranged in adjustable bearings F in the frame, and upon which springs G bear to create a pressure between the two cylinders. H is an endless band running around a pulley, I, above and a corresponding pulley, L, below, and one run of the belt pressed upon the surface of the convex cylinder by a pulley, P, running in close proximity to the surface of the two pulleys. On a line with or slightly above the surface of the concave cylinder C a cutter, R, is arranged, which is curved in transverse section corresponding to the surface of the said cylinders.

The meats are broken into pieces of various sizes, in the usual manner, and these pieces are successively introduced between the band H and the cylinder D, the concave side of the meat next the cylinder. The band is made to travel with substantially the same velocity as that of the cylinder. Thus introduced, the meat, by the pressure of the band, conforms to the shape of the cylinder D, and is carried around and passes between the two cylinders; thence out toward the cutter R, the cutter taking off the rind, which drops through the throat $d$, while the meat passes on to the trough-like cutter to be removed for further treatment.

The thickness of the paring may be varied by adjusting the cutter relatively to the cylinder C.

The meat may be introduced between the two cylinders without the intervention of the endless band; but, in practice, the work is found to be better done by employing the belt.

I claim—

1. The combination of the concave and convex cylinders and the correspondingly concavo-convex cutter R, arranged relatively to each other, substantially as and for the purpose specified.

2. The combination of the concave and convex cylinders, the endless band H bearing upon the surface of the convex cylinder, and the correspondingly concavo-convex cutter, substantially as and for the purpose set forth.

EDWARD SMITH.
E. C. MALTBY.

Witnesses:
ELLEN PHELAN,
ISABEL A. PHELAN.